US006687625B2

(12) United States Patent
Srinivasan et al.

(10) Patent No.: US 6,687,625 B2
(45) Date of Patent: Feb. 3, 2004

(54) METHOD AND APPARATUS FOR FEATURE TRACKING STRAIN ESTIMATION FOR ELASTOGRAPHY

(75) Inventors: Seshadri Srinivasan, Houston, TX (US); Jonathan Ophir, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 8 days.

(21) Appl. No.: 10/127,224

(22) Filed: Apr. 22, 2002

(65) Prior Publication Data

US 2003/0200036 A1 Oct. 23, 2003

(51) Int. Cl.$^7$ ............................................... G01L 3/00
(52) U.S. Cl. ........................................ 702/42; 702/43
(58) Field of Search ............................ 702/39, 40, 41, 702/42, 43, 71, 87, 94, 104; 600/437, 449; 73/597; 356/514

(56) References Cited

U.S. PATENT DOCUMENTS

| 5,178,147 A | * | 1/1993 | Ophir et al. | 600/437 |
|---|---|---|---|---|
| 5,293,870 A | * | 3/1994 | Ophir et al. | 600/437 |
| 5,474,070 A | * | 12/1995 | Ophir et al. | 600/437 |

OTHER PUBLICATIONS

Tomy Varghese et al, A theoretical framework for performance characterization of elastography: the strain filter, 1997, IEEE transactions on ultrasonics, ferroeletrics, and frequency control, vol.44, No.1, pp. 164–172.*

Marvin M. Doyley, et al., "A Freehand Elastographic Imaging Approach for Clinical Breast Imaging: System Development and Performance Evaluation," Ultrasound in Med. & Biol., vol. 27, No. 10, 1347–1357, 2001.

F. Kallel, et al. "Fundamental Limitations on the Contrast–Transfer Efficiency in Elastography: An Analytic Study," Ultrasound in Med. & Biol., vol. 22, No. 4, 463–470, 1996.

Elisa Konofagou, et al., "A New Elastograpic Method for Estimation and Imaging of Lateral Displacements, Lateral Strain, Corrected Axial Strains and Poisson's Ratios in Tissues," Ultrasound in Med. & Biol., vol. 24, No. 8, 1183–1199, 1998.

E.E. Konofagou, et al., "Power Strain Estimators in Elastography," Ultrasound in Med. & Biol., vol. 25, No. 7, 1115–1129, 1999.

P.A. Narayana, et al., "The Measurement of Attenuation in Nonlinearly Attenuating Media by the Zero Crossing Method," Ultrasound in Med & Biol., vol. 10, No. 6, 715–718, 1984.

J. Ophir, et al., "Attenuation Estimation with the Zero–Crossing Technique: Phantom Studies," Ultrasonic Imaging 7, 122–132, 1985.

Raffaella Righetti, et al., "Elastographic Characterization of Hifu–Induced Lesions in Canine Livers," Ultrasound in Med & Biol., vol. 25, No. 7, 1099–1113, 1999.

Benjamin M. Shapo, et al., "Displacement and Strain Imaging of Coronary Arteries with Intraluminal Ultrasound," IEEE Transactions on Ultrasonics, Ferroelectrics, and Frequency Control, vol. 43, No. 2, 234–246.

S. Srinivasan, et al., "A zero–crossing strain estimator for elastography," submitted to Ultrasound in Medicine and Biology, 1–41, Feb. 26, 2002.

(List continued on next page.)

Primary Examiner—Bryan Bui
(74) Attorney, Agent, or Firm—Duane Morris LLP

(57) ABSTRACT

The present invention is directed toward an apparatus and method for determining localized strain in a target body by identifying sets of features in reflected echo sequences and by comparing sets of features to determine time shift values between features.

27 Claims, 4 Drawing Sheets

OTHER PUBLICATIONS

S. Kaisar Alam, et al., "An Adaptive Strain Estimator for Elastography," IEEE Transactions on Ultrasonics, Ferroelectrics, and Frequency Control, vol. 45, No. 2, 461–472, Mar. 1998.

Jeffrey C. Bamber, et al., "Freehand Elasticity Imaging Using Speckle Decorrelation Rate," Acoustical Imaging, vol. 22, 285–292, 1996.

Elisabeth Brusseau, et al., "Axial Strain Imaging Using a Local Estimation of the Scaling Factor from RF Ultrasound Signals," Ultrasonic Imaging 22, 95–107, 2000.

F. Kallel, et al., "The Nonstationary Strain Filter in Elastography: Part II. Lateral and Elevational Decorrelation," Ultrasound in Med. & Biol., vol. 23, No. 9, 1357–1369, 1997.

I. Cespedes, Elastography: Imaging of Biological Tissue Elasticity, Ph.D. Dissertation, University of Houston, 61–139, 1993.

Ignacio Cespedes, et al., "Reduction of Image Noise in Elastography," Ultrasonic Imaging 15, 89–102, 1993.

Chris L. De Korte, et al., "Intravascular Elasticity Imaging Using Ultrasound: Feasibility Studies in Phantoms," Ultrasound in Med & Biol., vol. 23, No. 5, 735–746, 1997.

M.M. Doyley, An investigation into methods for improving the clinical usefulness of elasticity imaging, Ph.D. Dissertation, Univerisity of London, 81–114, 1999.

H.E. Talhami, et al., "Special Tissue Strain: A New Technique for Imaging Tissue Strain Using Intravascular Ultrasound," Ultrasound in Med. & Biol., vol. 20, No. 8, 759–772, 1994.

Tomy Varghese, et al., "Performance Optimization in Elastography: Multicompression with Temporal Stretching," Ultrasonic Imaging, 18, 193–214, 1996.

Tomy Varghese, et al., "Estimating Tissue Strain from Signal Decorrelation Using the Correlation Coefficient," Ultrasound in Med & Biol., vol. 22, No. 9, 1249–1254, 1996.

Tomy Varghese, et al., "A Theoretical Framework for Performance Characterization of Elastography: The Strain Filter," IEEE Transactions on Ultrasonics, Ferroelectrics, and Frequency Control, vol. 44, No. 1, Jan. 1997, 164–172.

Tomy Varghese, et al., "The Nonstationary Strain Filter in Elastography: Part I. Frequency Dependent Attenuation," Ultrasound in Med. & Biol., vol. 23, No. 9, 1343–1356, 1997.

Tomy Varghese, et al., "An Analysis of Elastographic Contrast-to-Noise Ratio," Ultrasound in Med. & Biol., vol. 24, No. 6, 915–924, 1998.

T. Varghese, et al., "Direct Strain Estimation in Elastography Using Spectral Cross-Correlation," Ultrasound in Med. & Biol., vol. 26, No. 9, 1525–1537, 2000.

James A. Zagzebski, et al., "Intervening Attenuation Affects First-order Statistical Properties of Ultrasound Echo Signals," IEEE Transactions on Ultrasonics, Ferroelectrics, and Frequency Control, vol. 46, No. 1, Jan. 1999, 35–40.

Charles H. Knapp, et al., "The Generalized Correlation Method for Estimation of Time Delay," IEEE Trans. Acoust., Speech, Signal Processing, vol. 24, No. 4, 320–327, Aug. 1976.

* cited by examiner

METHOD AND APPARATUS FOR FEATURE TRACKING STRAIN ESTIMATION FOR ELASTOGRAPHY

BACKGROUND OF THE INVENTION

1. Field of the Invention

The present invention is directed toward an apparatus and method for determining localized strain in a target body by identifying sets of features in reflected echo sequences and by comparing sets of features to determine time shift values between features.

2. Discussion of the Prior Art

Prior art techniques for making elastographic measurements require a large amount of data transfer and large processing times in order to obtain good elastographic images, thereby hindering the use of high quality real time elastography. This also hinders the use of hand held elastographic imaging systems.

Prior art elastographic data processing techniques utilize all information in the reflected signal. Much of this information is redundant and is therefore not useful for imaging purposes. The present invention offers the advantage of acquiring only useful and non-redundant features in the reflected signal, thereby reducing data acquisition time and processing time, without compromising the quality of the elastogram.

Prior art elastographic data processing techniques also utilize correlation schemes which rely upon uniform shifts between signals. Elastography signals inherently have non-uniform shifts. Accommodating for such non-uniform shifts requires apriori knowledge, which is difficult to acquire in practical situations, such as in-vivo tests. The present invention does not require any apriori information and it adaptively accounts for non-uniform shifts.

Many prior art methods stretch the post-compression A-lines to accommodate for non-uniform shifts. The present invention does not require such post-compression stretching.

Other prior art elastographic methods employ time domain correlation techniques. Stretching is essential to obtain high quality elastograms using such correlation techniques. In many practical situations, such as breast or prostate imaging, an accurate estimate of the compressed distance, and hence the stretch factor, is not readily ascertainable for all A-lines in a transducer array. This results in using local adaptive stretching of the post-compression A-line. Such post-adaptive stretching techniques are significantly slower than global stretching algorithms used for analyzing elastographic data.

Other prior art elastographic techniques employ spectral analysis that does not comprise stretching. Such techniques are suitable only for strains of more than five percent and have significantly lower signal to noise ratios (SNR) than conventional techniques, such as time domain correlation. An advantage of the present invention over spectral techniques is that it provides real time processing of up to 30 frames per second for a target depth of 60 millimeters in a software implementation. The present invention may be implemented in a hardware device, further increasing the imaging speed and thereby resulting in feasibility for use in displaying a simultaneous sonogram and elastogram. The present invention further offers the advantage of being able to switch between temporal tracking and cumulative averaging, without adversely affecting processing time. The present invention allows a multi-resolution elastogram without any increase in processing time. Prior art, elastographic methods require increased processing time in order to produce a multi-resolution elastogram.

SUMMARY OF THE INVENTION

The present invention is directed toward a method for determining localized strain in a target body. This method comprises the steps of acoustically coupling at least one ultrasound source to a target body and then emitting a first pulse of ultrasound energy of a known central wavelength from the source along the first radiation access into the target body. The method embodiment of the invention further comprises recording a first echo sequence having at least one echo segment arriving in response to the first pulse of ultrasound energy and then locating at least one feature in the first echo sequence arriving in response to the first pulse of ultrasound energy as a function of time to form a first set of features. The term "feature," as used herein, refers to any discernable echo segment characteristic or combination of characteristics. Features may include, but are not limited to, level crossings, peaks, valleys, or combinations thereof. The term "zero crossing," as used herein, refers to a level crossing that occurs at a designated zero value on the Y axis.

The method of the present invention further comprises displacing the target body along the first radiation axis by a known displacement and emitting a second pulse of ultrasound energy from the source along the first radiation axis into the target body.

The method embodiment of the invention further comprises recording a first echo sequence having at least one echo segment arriving in response to the second pulse of ultrasound energy and then locating at least one feature in the first echo sequence arising in response to the second pulse of ultrasound energy as a function of time to form a second set of features.

The first set of features is then compared to the second set of features to determine a set of time shift values as a function of time. Based upon this comparison, the local strain in the target body along portions of the first radiation access are determined.

The present invention is also directed toward an apparatus for determining localized strain in a target body. The apparatus comprises a transducer capable of receiving a reflected ultrasound echo sequence comprising at least one echo segment from a target body. The transducer is further capable of outputting an electrical analog signal indicative of the echo sequence. The apparatus embodiment further comprises a pulser electrically coupled to the transducer and a clock electrically coupled to trigger the pulser in order to send electrical energy to the transducer.

The apparatus embodiment further comprises a filter coupled to receive the electrical analog signal from the transducer. The filter is capable of producing a filtered analog electrical signal from the incoming signal.

The invention further comprises a feature detector coupled to receive a filtered electrical analog signal from the filter. The feature detector is capable of detecting preselected features in the filtered electrical analog signal as a function of time, as measured by the clock. The featured detector is further capable of outputting a feature attribute signal indicative of the magnitude and temporal location of each feature.

The apparatus embodiment of the present invention further comprises a buffer coupled to the feature detector and capable of receiving and storing the feature attribute signal. The invention further comprises a counter coupled to the buffer and capable of counting the number of features stored in the buffer.

DESCRIPTION OF THE PREFERRED EMBODIMENTS

The present invention is directed toward a method for determining localized strain in a target body. This method comprises the steps of acoustically coupling at least one ultrasound source to a target body and then emitting a first pulse of ultrasound energy of a known central wavelength from the source along the first radiation axis into the target body, as shown in blocks 60 and 62 of FIG. 1a. The invention further comprises recording a first echo sequence having at least one echo segment arriving in response to the first pulse of ultrasound energy and then locating at least one feature in the first echo sequence arriving in response to the first pulse of ultrasound energy as a function of time to form a first set of features, as shown in blocks 64 and 66 of FIG. 1a. The term "feature," as used herein, refers to any discernable echo segment characteristic or combination of characteristics. Features may include, but are not limited to, level crossings, peaks, valleys, or combinations thereof. The term "zero crossing," as used herein, refers to a level crossing that occurs at a designated zero value on the Y axis.

Figure 1:
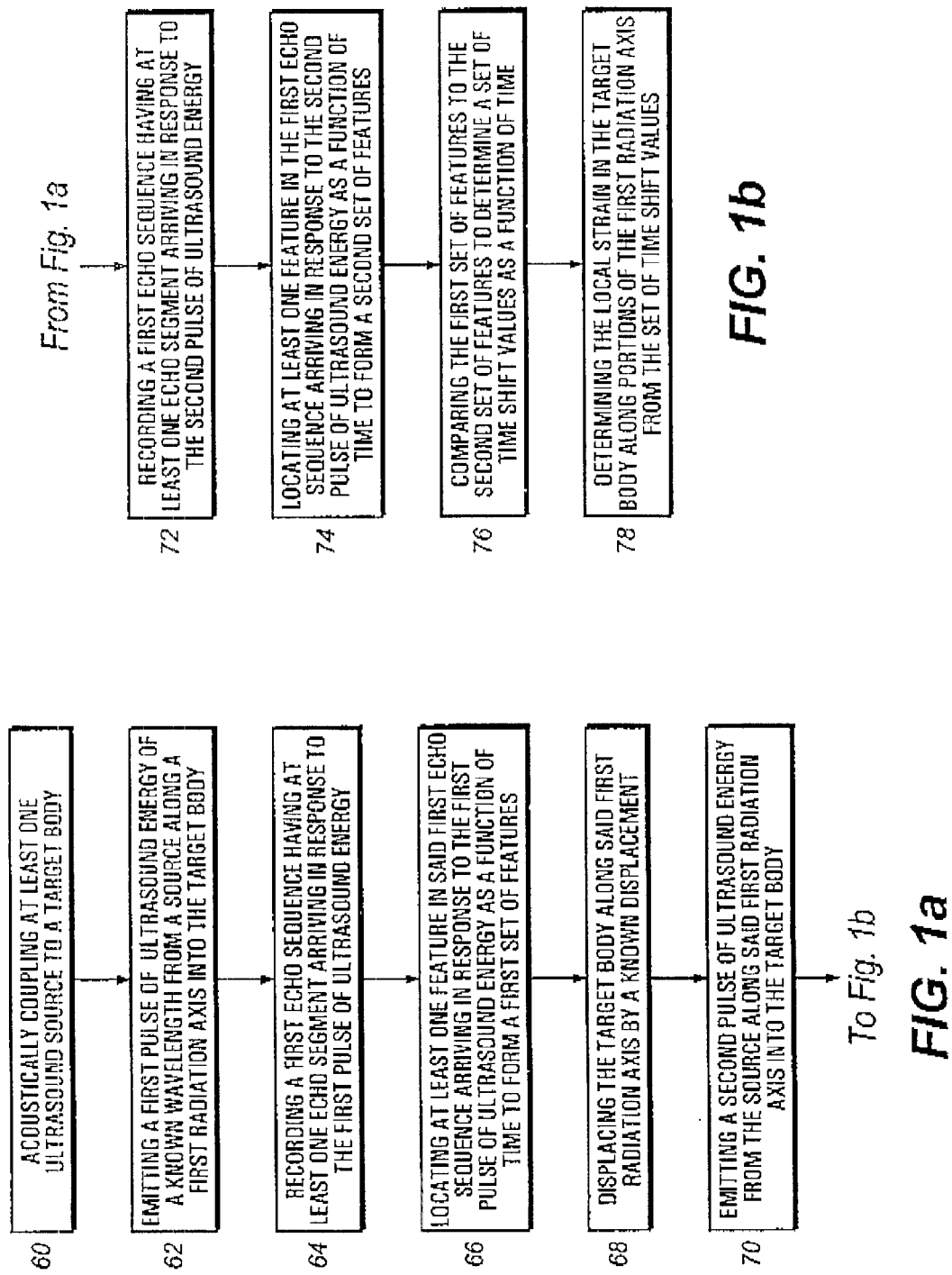
FIGS. 1a–1b are a block diagram of a first method embodiment of the present invention.

The method of the present invention further comprises displacing the target body along the first radiation axis by a known displacement and emitting a second pulse of ultrasound energy from the source along the first radiation axis into the target body, as shown in blocks 68 and 70 of FIG. 1a. In a preferred embodiment, the displacing is compressing. In another preferred embodiment, the displacing is decompressing.

The method of the present invention further comprises recording a first echo sequence having at least one echo segment arriving in response to the second pulse of ultrasound energy and then locating at least one feature in the first echo sequence arising in response to the second pulse of ultrasound energy as a function of time to form a second set of features, as shown in blocks 72 and 74 of FIG. 1b.

The first set of features is then compared to the second set of features to determine a set of time shift values as a function of time, as shown in block 76 of FIG. 1b. In one preferred embodiment, the first and second set of features each comprise at least one set of level crossings. In another preferred embodiment, the level crossings are zero crossings. In another preferred embodiment, the first and second set of features comprise at least one peak and one valley. In another preferred embodiment, the first and second set of features comprise at least one pair of level crossings in addition to at least one peak and one valley. In another preferred embodiment, the level crossings comprise at least one zero crossing and one non-zero level crossing.

Based upon this comparison, the local strain in the target body along portions of the first radiation axis are determined, as shown in block 78 of FIG. 1b. In a preferred embodiment, determining the local strain is accomplished by calculating the slope of time shift values as a function of time to produce a plurality of slope values. In a preferred embodiment, the slope calculation is performed for at least two wavelengths in the echo sequence. In another preferred embodiment, a plurality of strain profiles are obtained from the slope of time shift values.

In another preferred embodiment, the invention further comprises assigning a plurality of gray scale values to slope values. In another preferred embodiment, the invention further comprises producing a strain image based upon the plurality of gray scale values.

Another preferred embodiment of the present invention involves multi-displacements and comparisons. In this multi-displacement embodiment, the steps shown in blocks 60, 62, 64, 66, 68, 70 and 72 of FIGS. 1a–1b are performed. The target body is then displaced again along the radiation axis, as shown in block 68 of FIG. 1b. In a preferred embodiment, the target body is displaced by less than half a wavelength of ultrasound energy. The steps shown in blocks 70, 72, and 74 of FIGS. 1a–1b are then performed.

At this point in the multi-displacement embodiment of the invention, there are three sets of features. The invention further comprises comparing one set of features to another set of features to determine a set of time shift values as a function of time. This comparison may also comprise multiple comparisons between different sets of features. This multi-displacement method can be expanded to repeat the steps shown in blocks 60, 62, 64, 66, 68, 70, and 72 of FIGS. 1a–1b, n times. Multiple comparisons of sets of features can be made from the n sets of features. The multi-displacement method further comprises performing the step shown in block 78 of FIG. 1b.

Figure 2:
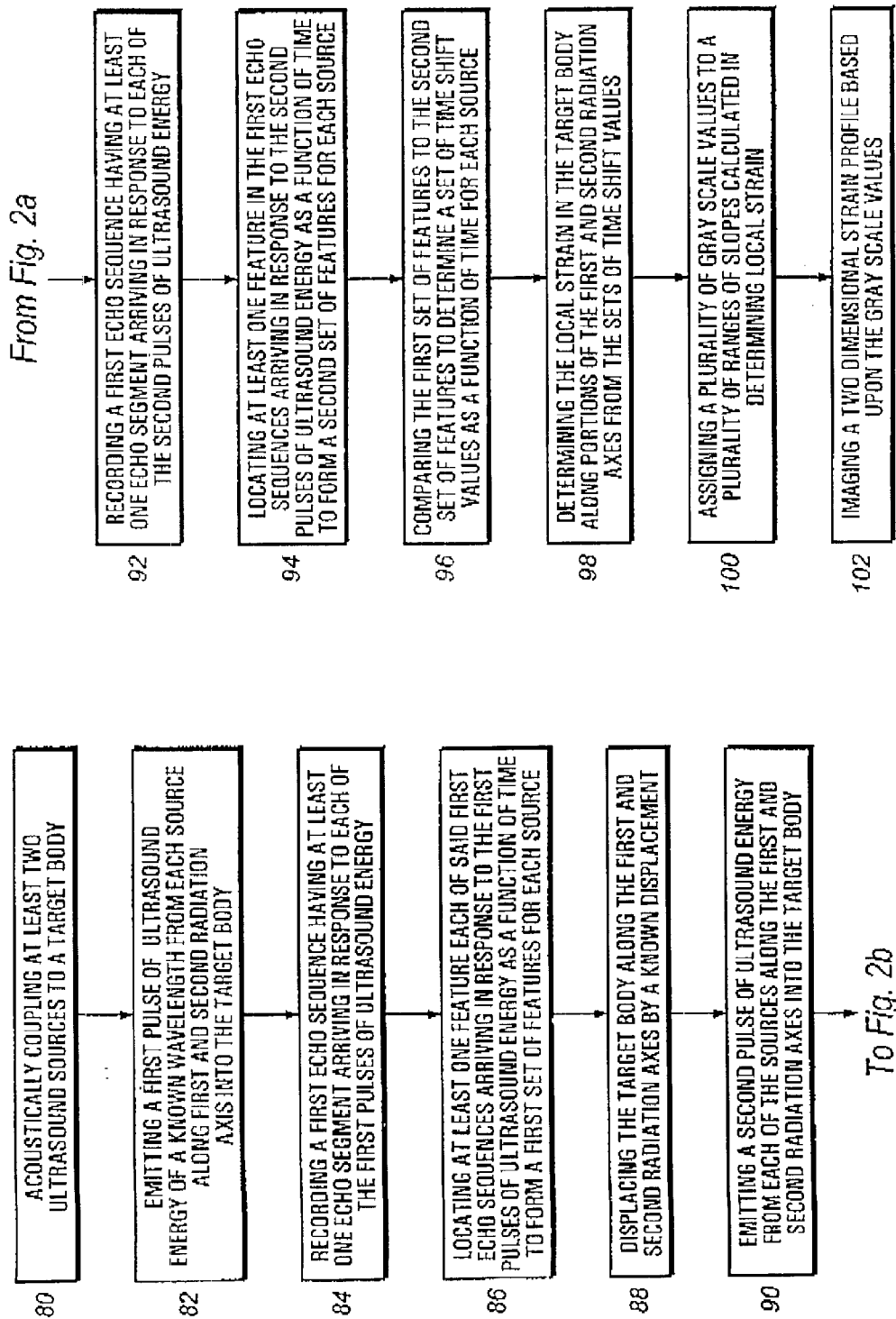
FIGS. 2a–2b are a block diagram of a second method embodiment of the present invention.

In a preferred embodiment, the method of the present invention can be performed using two ultrasound sources which emit a pulse of ultrasound energy along first and second radiation axes into the target body as shown in blocks 80 and 82 of FIG. 2a.

The invention further comprises recording a first echo sequence having at least one echo segment arriving in response to each of the first pulses of ultrasound energy, as shown in block 84 of FIG. 2a. The multi-transducer embodiment of the invention further comprises locating at least one feature in each of the first echo sequences arising in response to the first pulses of ultrasound energy as a function of time in order to form a first set of features for each source, as shown in block 86 of FIG. 2a.

This embodiment of the invention further comprises displacing the target body along the first and second radiation axis by a known displacement, and then emitting a second pulse of ultrasound energy from each of the sources along the first and second radiation axes into the target body, as shown in blocks 88 and 90 of FIG. 2a.

The multi-transducer method of the present invention further comprises recording a first echo sequence having at least one echo segment arising in response to each of the second pulses of ultrasound energy and locating at least one feature in the first echo sequences arising in response to the second pulses of ultrasound energy as a function of time to form a second set of features for each source, as shown in blocks 92 and 94 of FIG. 2b.

The multi-transducer embodiment of the present invention further comprises comparing the first set of features to the second set of features to determine the set of time shift values as a function of time for each source and then determining the local strain in the target body along portions of the first and second radiation axes from the sets of time shift values, as shown in blocks 96 and 98 of FIG. 2b.

In a preferred embodiment, the local strain is accomplished by calculating the slope of time shift values plotted as a function of time for each source. In a preferred embodiment, the invention further comprises assigning a plurality of gray scale values to a plurality of slope values calculated in determining local strain, as shown in block 100 of FIG. 2b. In another preferred embodiment, the invention further comprises imaging a two dimensional strain profile based upon the gray scale values, as shown in block 102 of FIG. 2b.

The present invention is also directed toward an apparatus for determining localized strain in a target body. The apparatus comprises a transducer 16 capable of receiving a reflected ultrasound echo sequence 10 comprising at least one echo segment from a target body. The transducer is further capable of outputting an electrical analog signal 18 representing the echo sequence. The apparatus embodiment further comprises a pulser 14 electrically coupled to the transducer and a clock 12 electrically coupled to trigger the pulser in order to send electrical energy to the transducer, as shown in FIG. 3a.

Figure 3:
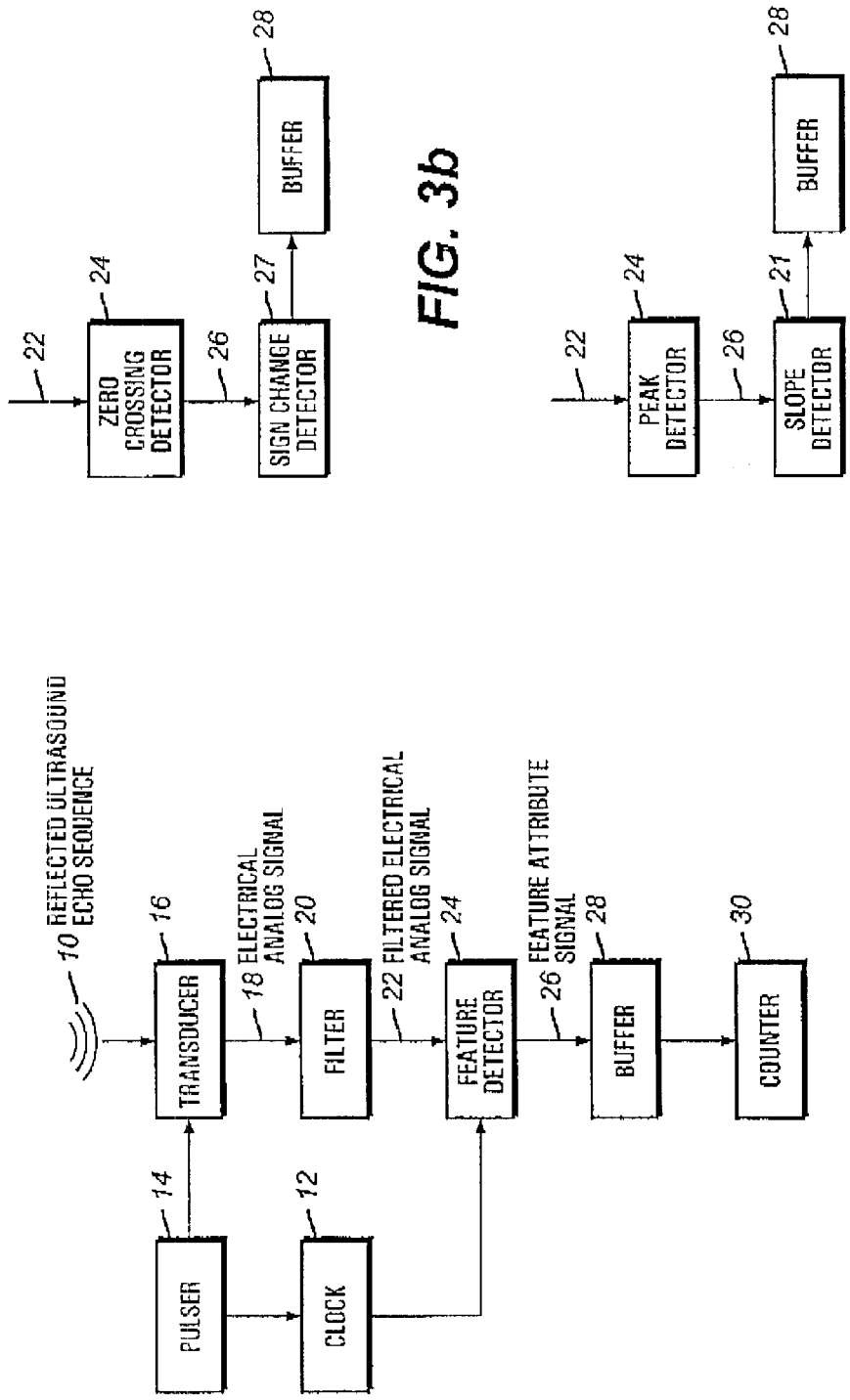
FIG. 3a is a block diagram of a first apparatus embodiment of the present invention.
FIGS. 3b–3c are various embodiments of feature detectors of an apparatus embodiment of the present invention.

The apparatus embodiment further comprises a filter 20 coupled to receive the electrical analog signal from the transducer, as shown in FIG. 3a. The filter is capable of producing a filtered electrical analog signal 22 from the electrical signal. In a preferred embodiment, the filter is a band pass filter.

The invention further comprises a feature detector 24 coupled to receive a filtered electrical analog signal from the filter, as shown in FIG. 3a. The featured detector is capable of detecting preselected features in the filtered electrical analog signal as a function of time, as measured by the clock. The featured detector is further capable of outputting a feature attribute signal 26 indicative of the magnitude and temporal location of each feature.

In one preferred embodiment, as shown in FIG. 3b, the feature detector is a zero crossing detector 24 coupled to a sign change detector 27, as shown in FIG. 3b. The sign change detector is coupled to output a sign change signal to a buffer. In another preferred embodiment, as shown in FIG. 3c, the feature detector is a peak detector 24 coupled to a slope detector 21. The slope detector outputs a signal to a buffer.

The apparatus embodiment of the present invention further comprises a buffer 28 coupled to the feature detector 24 and capable of receiving and storing the feature attribute signal 26, as shown in FIG. 3a. The invention further comprises a counter 30 coupled to the buffer and capable of counting the number of features stored in the buffer, as shown in FIG. 3a.

Figure 4:
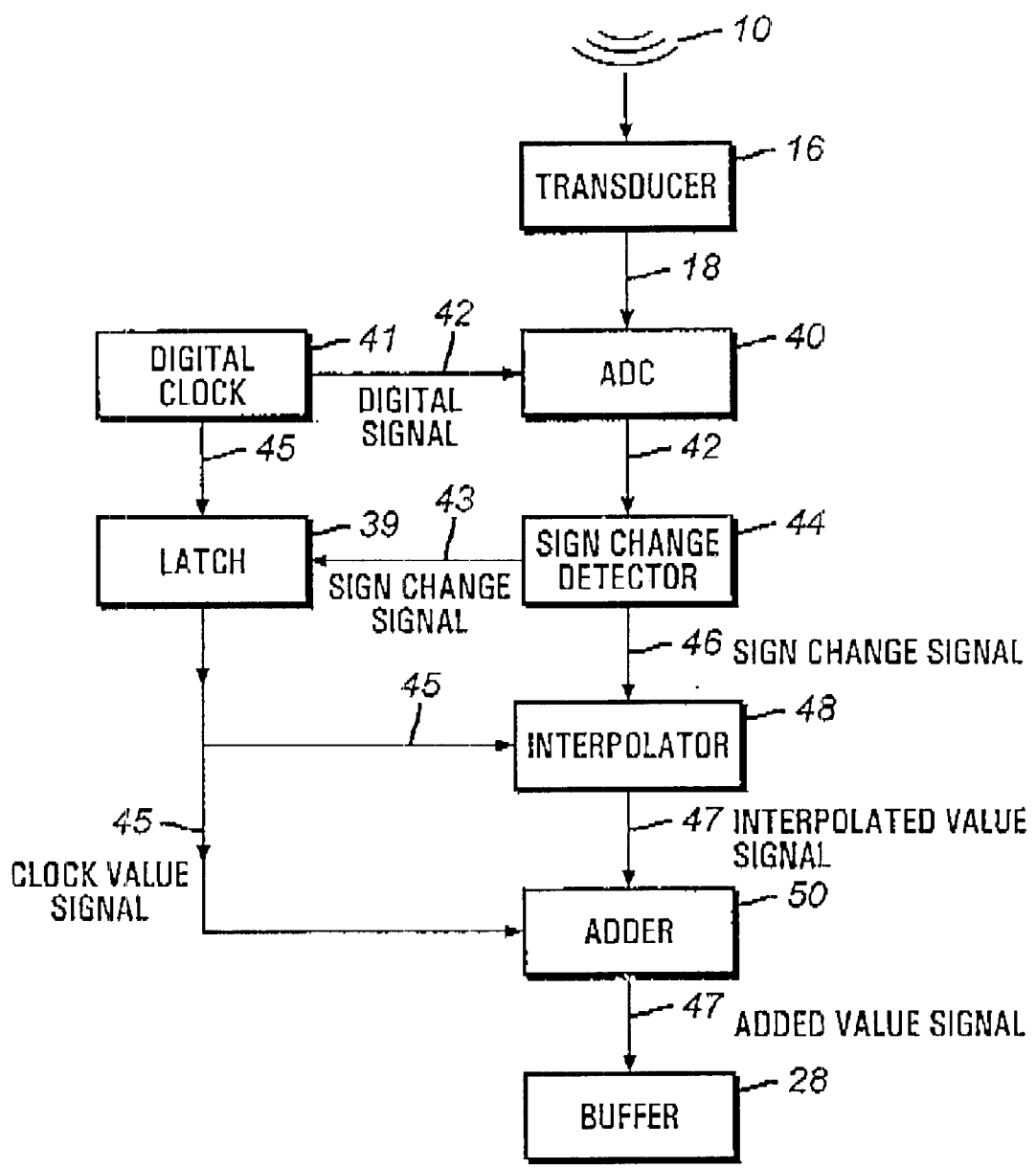
FIG. 4 is a block diagram of a second apparatus embodiment of the present invention.

A second apparatus embodiment of the present invention comprises a transducer 16 capable of receiving a reflected ultrasound echo sequence comprising at least one echo segment from a target body and is further capable of outputting an electrical analog signal 18 representing the reflected ultrasound sequence, as shown in FIG. 4.

The invention further comprises a synchronous analog to digital converter (ADC) 40 coupled to the transducer to receive the electrical analog signal and to convert the signal to a digital signal comprising at least two bits of information, and to output a digital signal representing the reflected ultrasound echo sequence.

This apparatus embodiment further comprises a sign change detector 44 coupled to receive the digital signal from the ADC, as shown in FIG. 4. The sign change detector is further capable of detecting a preselected change in the sign change of the most significant bit of the digital signal. The sign change detector is capable of outputting a sign change signal 46 representing the value of the detected sign changes, as shown in FIG. 4.

As shown in FIG. 4, this apparatus embodiment further comprises a digital clock 41 electrically coupled to transmit a digital signal to the ADC. The clock is capable of producing a clock value signal 45. This embodiment of the invention further comprises a latch 39 coupled to receive the clock value signal 45 from the clock and the sign change signal 43 from the sign change detector. The latch is further capable of emitting a clock value signal 45, as shown in FIG. 4.

This apparatus embodiment further comprises and interpolator 48 coupled to receive a sign change signal from the sign change detector and to receive a clock value signal from the latch, as shown in FIG. 4. The interpolator is capable of interpolating between consecutive sign change values received from the sign change detector in order to produce an interpolated value signal 47.

As shown in FIG. 4, this apparatus embodiment further comprises an adder 50 coupled to receive a clock value signal from the latch the clock and to receive an interpolated value signal from the interpolator. The adder is capable of adding the interpolated value signal to the clock signal and of producing an added value signal 51, as shown in FIG. 4. The adder is also capable of adding the interpolated value signal to the clock value signal and of producing an added value signal 51. The invention further comprises a buffer 28 coupled to receive an added value signal from the adder 50 and capable of storing feature data and the added value signal.

The foregoing disclosure and description of the invention are illustrative and explanatory. Various changes in the size, shape, and materials, as well as in the details of the illustrative construction may be made without departing from the spirit of the invention.

What is claimed is:

1. A method for determining localized strain in a target body comprising:
   a. acoustically coupling at least one ultrasound source to a target body;
   b. emitting a first pulse of ultrasound energy of a known wavelength from said source along a first radiation axis into the target body;
   c. recording a first echo sequence having at least one echo segment arriving in response to said first pulse of ultrasound energy;
   d. locating at least one level crossing in said first echo sequence arriving in response to said first pulse of ultrasound energy as a function of time to form a first level crossing;
   e. displacing the target body along said first radiation axis by a known displacement;
   f. emitting a second pulse of ultrasound energy from said source along said first radiation axis into the target body;
   g. recording a first echo sequence having at least one echo segment arriving in response to said second pulse of ultrasound energy;
   h. locating at least one level crossing in said first echo sequence arriving in response to said second pulse of ultrasound energy as a function of time to form a second level crossing;
   i. comparing said first level crossing to said second level crossing to determine a set of time shift values as a function of time; and j. determining the local strain in the target body along portions of said first radiation axis from said set of time shift values.

2. The method of claim 1, wherein said displacing is compressing.

3. The method of claim 1, wherein said displacing is decompressing.

4. The method of claim 1, wherein said level crossings are nonzero crossings.

5. The method of claim 1, wherein said level crossings are zero crossings.

6. The method of claim 1, wherein said level crossings comprise at least one peak and one valley.

7. The method of claim 1, wherein said level crossings comprises at least one peak.

8. The method of claim 1, wherein said level crossings comprises at least one zero crossing and one nonzero crossing.

9. The method of claim 1, wherein said determining the local strain is accomplished by calculating the slope of time shift values as a function of time to produce a plurality of slope values.

10. The method of claim 9, further comprising assigning a plurality of gray scale values to said plurality of slope values.

11. The method of claim 9, further comprising imaging a strain profile based upon said plurality of gray scale values.

12. The method of claim 1, further comprising imaging a strain profile from said determined local strain.

13. A method for determining localized strain in a target body comprising:
   a. acoustically coupling at least two ultrasound sources to a target body;
   b. emitting a first pulse of ultrasound energy of a known wavelength from each source along first and second radiation axis into the target body;
   c. recording a first echo sequence having at least one echo segment arriving in response to each of said first pulses of ultrasound energy;
   d. locating at least one peak and one valley in each of said first echo sequences arriving in response to said first pulses of ultrasound energy as a function of time to form a first peak and valley pair for each source;
   e. displacing the target body along said first and second radiation axes by a known displacement;
   f. emitting a second pulse of ultrasound energy from each of said sources along said first and second radiation axes into the target body;
   g. recording a first echo sequence having at least one echo segment arriving in response to each of said second pulses of ultrasound energy;
   h. locating at least one peak and one valley in said first echo sequences arriving in response to said second pulses of ultrasound energy as a function of time to form a second peak and valley pair for each source;
   i. comparing said first peak and valley pair to said second peak and valley pair to determine a set of time shift values as a function of time for each source; and
   j. determining the local strain in the target body along portions of said first and second radiation axes from said sets of time shift values.

14. The method of claim 13, wherein said determining the local strain is accomplished by calculating the slope of time shift values plotted as a function of time for each source.

15. The method of claim 14, further comprising assigning a plurality of gray scale values to a plurality of ranges of slopes calculated in determining local strain.

16. The method of claim 15, further comprising producing a strain image based upon said gray scale values.

17. The method of claim 13, wherein said known displacement is less than one half wavelength.

18. A apparatus for determining localized strain in a target body, comprising:
   a. a transducer capable of receiving a reflected ultrasound echo sequence comprising at least one echo segment from a target body and outputting an electrical analog signal representing said echo sequence;
   b. a pulser electrically coupled to said transducer;
   c. a clock electrically coupled to trigger said pulser to send electrical energy to said transducer;
   d. a filter coupled to receive said unfiltered electrical analog signal and capable of producing a filtered analog electrical signal from said electrical analog signal;
   e. a feature detector coupled to receive said filtered electrical analog signal from said filter and capable of detecting preselected features in said filtered electrical analog signal as a function of time, as measured by said clock, and further capable of outputting a feature attribute signal indicative of the magnitude and temporal location of each feature;
   f. a buffer coupled to said feature detector and capable of receiving and storing said feature attribute signal; and
   g. a counter coupled to said buffer and capable of counting the number of features stored in said buffer.

19. The apparatus of claim 18, wherein said feature detector is a zero crossing detector.

20. The apparatus of claim 19, further comprising a sign change detector coupled to said zero crossing detector.

21. The apparatus of claim 18, wherein said feature detector is a peak detector.

22. The apparatus of claim 21, further comprising a slope detector coupled to said peak detector.

23. The apparatus of claim 18, wherein said filter is a band pass filter.

24. An apparatus for determining localized strain in a target body, comprising:
   a. a transducer capable of receiving a reflected ultrasound echo sequence comprising at least one echo segment from a target body and further capable of outputting an electrical analog signal representing said reflected ultrasound echo sequence;
   b. a synchronous analog to digital converter coupled to said transducer to receive said electrical analog signal, to convert said analog signal to a digital signal comprising at least two bits of information, and to output a digital signal representing said reflected ultrasound echo sequence;
   c. a sign change detector coupled to receive said digital signal from said analog to digital converter, said sign change detector being capable of detecting a preselected change in the sign of the most significant bit of said digital signal and of outputting a sign change signal representing the value of said detected sign changes;
   d. a digital clock electrically coupled to transmit a digital signal to said analog to digital converter, said clock further being capable of producing a clock value signal;
   e. a latch coupled to receive a clock value signal from said clock and a sign change signal from said sign change detector, said latch being capable of emitting a clock value signal;
   f. an interpolator coupled to receive a sign change signal from said sign change detector and to receive a clock value signal from said latch, said interpolator being capable of interpolating between consecutive sign change values received from said sign change detector to produce an interpolated value signal;

g. an adder coupled to receive a clock value signal from said latch and to receive an interpolated value signal from said interpolator, said adder being capable of adding said interpolated value signal to said clock value signal and of producing an added value signal; and h. a buffer coupled to receive an added value signal from said adder and capable of storing said feature data and said added value signal.

25. A method for determining localized strain in a target body comprising:

a. acoustically coupling at least one ultrasound source to a target body;

b. emitting a first pulse of ultrasound energy of a known wavelength from said source along a first radiation axis into the target body;

c. recording a first echo sequence having at least one echo segment arriving in response to said first pulse of ultrasound energy;

d. locating at least one level crossing in said first echo sequence arriving in response to said first pulse of ultrasound energy as a function of time to form a first level crossing;

e. displacing the target body along said first radiation axis by a known displacement;

f. emitting a second pulse of ultrasound energy from said source along said first radiation axis into the target body;

g. recording a first echo sequence having at least one echo segment arriving in response to said second pulse of ultrasound energy;

h. locating at least one level crossing in said first echo sequence arriving in response to said second pulse of ultrasound energy as a function of time to form a second level crossing;

i. displacing the target body along said first radiation axis by a known displacement;

j. emitting a third pulse of ultrasound energy from said source along said first radiation axis into the target body;

k. recording a first echo sequence having at least one echo segment arriving in response to said third pulse of ultrasound energy;

l. locating at least one level crossing in said first echo sequence arriving in response to said third pulse of ultrasound energy as a function of time to form a third level crossing;

m. comparing on one of said level crossings to another of said level crossings to determine a set of time shift values as a function of time; and n. determining the local strain in the target body along portions of said first radiation axis from said set of time shift values.

26. The method of claim 25, wherein said comparing comprises comparing said first level crossing with said second and said third level crossings.

27. The method of claim 25, wherein said known displacement is less than half a wavelength of the ultrasound energy.

* * * * *

UNITED STATES PATENT AND TRADEMARK OFFICE
CERTIFICATE OF CORRECTION

PATENT NO. : 6,687,625 B2
DATED : February 3, 2004
INVENTOR(S) : Seshadri Srinivasan and Jonathan Ophir It is certified that error appears in the above-identified patent and that said Letters Patent is hereby corrected as shown below:

Column 1,
Line 5, insert
-- GOVERNMENT RIGHTS
This invention was made with United States Government support under Grant No. 5 P01 CA64597, awarded by the National Institutes of Health and the National Cancer Institute. The United States Government has certain rights in the invention. --.

Signed and Sealed this

Third Day of January, 2006

JON W. DUDAS
*Director of the United States Patent and Trademark Office*